(12) United States Patent
Eidelman et al.

(10) Patent No.: US 7,873,734 B1
(45) Date of Patent: Jan. 18, 2011

(54) MANAGEMENT OF MULTIPLE USER SESSIONS AND USER REQUESTS FOR MULTIPLE ELECTRONIC DEVICES

(75) Inventors: Brian A. Eidelman, Evanston, IL (US); Joshua C. Bregman, Cambridge, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1174 days.

(21) Appl. No.: 10/150,351

(22) Filed: May 16, 2002

Related U.S. Application Data

(60) Provisional application No. 60/291,839, filed on May 17, 2001, provisional application No. 60/340,685, filed on Dec. 13, 2001.

(51) Int. Cl.
*G06F 15/16* (2006.01)
(52) U.S. Cl. .............................. 709/227; 709/203; 726/5
(58) Field of Classification Search .................. None
See application file for complete search history.

(56) References Cited

U.S. PATENT DOCUMENTS

| | | | | | |
|---|---|---|---|---|---|
| 5,329,619 | A | * | 7/1994 | Page et al. | 709/203 |
| 5,708,780 | A | * | 1/1998 | Levergood et al. | 709/229 |
| 6,006,251 | A | * | 12/1999 | Toyouchi et al. | 709/203 |
| 6,052,730 | A | * | 4/2000 | Felciano et al. | 709/225 |
| 6,073,175 | A | * | 6/2000 | Tavs et al. | 709/226 |
| 6,085,247 | A | * | 7/2000 | Parsons et al. | 709/227 |
| 6,098,093 | A | * | 8/2000 | Bayeh et al. | 709/203 |
| 6,324,648 | B1 | * | 11/2001 | Grantges, Jr. | 726/12 |
| 6,330,566 | B1 | * | 12/2001 | Durham | 707/104.1 |
| 6,496,824 | B1 | * | 12/2002 | Wilf | 707/10 |
| 6,691,232 | B1 | * | 2/2004 | Wood et al. | 726/6 |
| 6,742,043 | B1 | * | 5/2004 | Moussa et al. | 709/232 |
| 6,751,654 | B2 | * | 6/2004 | Massarani et al. | 709/219 |
| 6,877,095 | B1 | * | 4/2005 | Allen | 713/182 |

(Continued)

OTHER PUBLICATIONS

Handspring.com page dated Oct. 25, 2000 via Archive.org: http://web.archive.org/web/20001025005141/www.handspring.com/products/visorphone/index.jhtml;$sessionid$E3SMZTIAACVKJQFIAEGCFE4AVAARWIVO.*
Matsutti, "Distributed Web Session Management", Oct. 2000.*

*Primary Examiner*—Thu Nguyen
*Assistant Examiner*—Julian Chang
(74) *Attorney, Agent, or Firm*—Baker Botts L.L.P.

(57) ABSTRACT

A method and apparatus for supporting a plurality of user sessions for a plurality of electronic devices with or without cookie technology and transmitting requests and session data to appropriate servers in an enterprise network is provided. In accordance with one example embodiment, a method is provided of supporting a plurality of user sessions for a plurality of electronic devices. The method includes the step of receiving a user request from a client. A user session and a session key are established, the session key having an association with the user session. The plurality of user sessions can co-exist with other user sessions. A method is further provided for converting a plurality of incoming requests from a plurality of electronic devices into a plurality of new requests. The method includes reading one of the plurality of incoming requests and comparing at least one property associated with the request to at least one predetermined value. The one of the plurality of new requests is forwarded to a server device configured in a network, where the server device is determined by the result of comparing at least one property associated with the request to at least one predetermined value.

39 Claims, 9 Drawing Sheets

U.S. PATENT DOCUMENTS

| | | | | |
|---|---|---|---|---|
| 6,891,811 B1 * | 5/2005 | Smith et al. | | 370/310 |
| 6,910,180 B1 * | 6/2005 | Cui et al. | | 715/513 |
| 6,931,446 B1 * | 8/2005 | Cox et al. | | 709/227 |
| 7,370,004 B1 * | 5/2008 | Patel et al. | | 705/14 |
| 7,574,486 B1 * | 8/2009 | Cheng et al. | | 709/203 |
| 2002/0032797 A1 * | 3/2002 | Xu | | 709/238 |
| 2002/0059367 A1 * | 5/2002 | Romero et al. | | 709/203 |
| 2002/0059387 A1 * | 5/2002 | Wolfe | | 709/206 |
| 2002/0065774 A1 * | 5/2002 | Young et al. | | 705/41 |
| 2002/0116531 A1 * | 8/2002 | Chu | | 709/246 |
| 2002/0160805 A1 * | 10/2002 | Laitinen et al. | | 455/550 |
| 2003/0110266 A1 * | 6/2003 | Rollins et al. | | 709/227 |

* cited by examiner

```
Condition: Type = "User-agent"
  Case: Value = "Palm"
        Condition: Type = "URI"
          Case: Value beginswith "banking"
              Forward request to http://banking.palm.companyname.com/banking$1
          EndCase
          Case: Default
              Forward request to http://palm.companyname.com
          EndCase
        EndCondition
  EndCase
  Case: Value = "Nokia_WAP"
            Forward request to http://wap.companyname.com$1
  EndCase Case: Default
            Forward request to www.companyname.com
  EndCase EndCondition Condition: Type = "Host"
  Case: Value = "pda.security.com"
        Condition: Type = "URI"
          Case: Value beginswith "banking"
              Forward request to http://banking.pda.companyname.com/banking$1
          EndCase
          Case: Default
              Forward request to http://pda.companyname.com
          EndCase
        EndCondition
  EndCase Case: Value = "wapdevice.security.com"
            Forward request to http://wap.companyname.com$1
  EndCase Case: Default
            Forward request to www.companyname.com
  EndCase EndCondition
```

*FIG. 9*

MANAGEMENT OF MULTIPLE USER SESSIONS AND USER REQUESTS FOR MULTIPLE ELECTRONIC DEVICES

RELATED APPLICATIONS

This application claims priority to, and the benefit of, co-pending U.S. Provisional Application No. 60/291,839, filed May 17, 2001, and co-pending U.S. Provisional Application No. 60/340,685, filed Dec. 13, 2001, for all subject matter common to the Provisional Applications and this application. The disclosures of said Provisional Applications are hereby incorporated by reference in their entirety.

FIELD OF THE INVENTION

The present invention relates to establishing and maintaining network sessions, and more particularly to supporting multiple network sessions for different types of devices with or without cookie technology, and transmitting requests and session data to appropriate servers in an enterprise network.

BACKGROUND OF THE INVENTION

Business and research is commonly conducted over the Internet using applications that a non-profit or for-profit enterprise makes available via the World Wide Web. Web-based applications enable enterprises to offer a wide range of products and services. For example, corporations may have web-based applications that support business processes, such as online retail, customer service, supply chain procurement, and delivery of operational and transactional data.

Communication over the Internet is effected via wired and wireless devices. Examples of wired and wireless devices are personal computers and handheld devices having networking capabilities such as personal digital assistants (PDAs). Devices utilize web browsers to interface to the World Wide Web. Frequently used web browsers are NETSCAPE NAVIGATOR, which is available from NETSCAPE COMMUNICATIONS CORPORATION of Mountain View, Calif., and INTERNET EXPLORER, available from MICROSOFT CORPORATION of Redmond, Wash.

New devices are continuously becoming available to access the Internet. Such devices include pocket PCs, smart phones, and devices that interface to a television set, in addition to personal digital assistants (PDAs). The various devices support a number of different communication protocols to transmit and receive data. The Wireless Application Protocol (WAP) is a specification that allows users to access information via handheld wireless devices such as mobile phones, pagers, two-way radios, and smart phones. The Handheld Device Markup Language (HDML) is an extension of the Wireless Markup Language (WML) and is used to format content for Web-enabled mobile phones. HDML is a proprietary language for products from phone.com (a division of Openwave Systems Inc. of Redwood, Calif.). HDML can only be used on mobile phones that use phone.com browsers. Wireless products from other manufacturers, such as NTT DoCoMo of Tokyo, Japan, also use proprietary protocols.

World Wide Web servers transmit data using the HyperText Transfer Protocol (HTTP). Therefore, data from devices that do not support HTTP must have a means to convert data to HTTP. One such means is to transmit data through a gateway system. Generally, devices that communicate using protocols other than HTTP communicate over proprietary networks to the gateway system. The gateway system then communicates over the Internet using HTTP on behalf of the devices. The wireless Internet is facilitated through gateway systems.

A gateway system may be a combination of hardware and software that links different types of computer networks to one another. A gateway system intercepts requests and may convert a non-HTTP protocol to HTTP, or in some cases to the secure HTTP protocol (HTTPS), when a transmission is received from a device. The gateway system also converts an HTTP or an HTTPS message to an appropriate non-HTTP protocol when the transmission is sent in the other direction, that is, from a World Wide Web server to a device that does not support HTTP.

A wireless carrier may maintain a gateway, and possibly, configure the gateway in such a way that the gateway is unavailable to other software vendors for integration purposes, such as not allowing the gateway to integrate software plug-ins (i.e., software modules that add specific functionality to software applications). Even when a gateway may be available for integration purposes, integration may be difficult because integration standards do not exist in the industry.

Proxy servers are configured in some enterprise networks. Proxy servers may provide access controls, for example, security mechanisms and authorization controls. Proxy servers may also provide for Secure Sockets Layer (SSL) acceleration, load balancing, caching, and other features. In general terms, a proxy server functions as a filter between the Internet and an enterprise network. A proxy server receives a request for an Internet client (e.g., a web page request) from a user. If the request passes filtering requirements, the proxy server, acting as a client on behalf of the user, uses an Internet protocol (IP) address that identifies the proxy server (rather then the client making the request) to request the page from a back-end server configured in the enterprise network. When the page is returned, the proxy server forwards the page to the user using an IP address that identifies the proxy server (rather than the back-end server). Using the proxy server's IP address increases security because the IP address of the client is hidden from the back-end server and the IP address of the back-end server is hidden from the client.

A proxy server may be guided by proxy rules that determine where incoming requests should be forwarded. Existing proxy servers use the uniform resource locator (URL) of the original request as the context for the proxy rules. Proxy rules may be implemented in software as regular expressions. Proxy rules do not take into consideration the device type when transmitting a request or information about the user making the request.

Once a user accesses an enterprise network, the enterprise may want to store information about a user. An enterprise may find such information essential for security purposes to prevent unauthorized users from accessing protected resources. To secure access, the enterprise may use the information to control which users can gain access to particular computers and resources and what specific users may do while using a web-based application.

The user information stored by the enterprise is referred to herein as a user session, or simply, a session. Session data is used to identify a user to an application or set of applications. Some products place entitlement data in a user session to specify what the user may do with the application (e.g., permit a user to trade on margin or purchase a product on credit). The data contained in the session may include a user identifier and preferences. Additionally, if the user is authenticated, a session may store authentication data. The session is valid for a specified period of time; therefore, data is also stored in the session that specifies when the session expires.

Essentially, the session holds the state of a user. The way in which a device may hold the state of a user, also referred to as client state, may vary from device to device. Each device may have a particular method for storing client state depending on the device's components and resources, and depending on the user's preferences. A common mechanism that stores client state creates a text file called a cookie. Generally, a cookie is used to track behavioral patterns and information in the cookie may be used for authorization decisions. Although, a cookie may store a user's behavioral patterns as well as authorization information, neither is stored exclusively in a cookie. Additionally, data in the cookie may help an application customize the application interface for the user. An enterprise system may generate a cookie and send that cookie to the user's browser with web content. The browser then may store the cookie on the user's device. The browser transmits the cookie to the enterprise network with a request. Various computers in the enterprise network may receive the cookie and use the contents of the cookie to gather information about the particular user. A drawback with cookies is that cookies are only delivered to specified sets of URLs within a single domain. For example, a cookie may only be valid for the URL finance/mycompany.com within the domain mycompany.com.

Furthermore, cookies may or may not be supported by a particular device. Even if a device supports cookies, a user of the device may choose not to accept a cookie. Memory constraints may be one reason for not permitting cookies to be stored on a device. A device may not have the capability of storing the cookie, which can be as large as several hundred bytes, because the device may not contain enough memory to accommodate a large number of cookies, or large cookies.

Another reason for not permitting cookies to be stored on a device may be performance considerations. The size of a cookie may be as large as the content that a user may receive from an application. Thus, sending a cookie to a device may double the transmission time to accomplish a task (many wireless connections currently support a bandwidth of only 9600 baud).

Cost may be another consideration when determining whether to permit cookies to be stored on a device. Many wireless plans charge a per-packet rate. When a user is charged according to the amount of information that is transmitted to and from the device, a cookie may greatly increase the operational costs of the device, thereby increasing the expense incurred in using a wireless device.

Further, many users choose not to accept cookies for security and privacy reasons. The identifying information stored in a cookie and information about the user can often be shared with computers outside of the user's controlled environment. The user may wish to prevent the sharing of this information with unknown computers.

For the aforementioned reasons, cookies may not be a feasible method for holding client state for many wired and wireless devices. The proliferation of devices used to access information over the Internet demands other mechanisms for holding a client's state besides cookies. Some HTTP servers may implement other mechanisms for holding a client state; however, such HTTP servers can support only one mechanism at a time, making them inappropriate for serving certain content and serving to certain devices. Presently, HTTP-based software servers fail to provide a general solution for simultaneously holding client state for numerous users accessing a variety of applications on a network using a multitude of wired and wireless devices, especially when the applications are designed for particular security and performance requirements. Thus, an enterprise needs the capability to efficiently maintain user sessions for all users and for all devices using device-specific and application-specific requirements. A mechanism is needed that can maintain sessions in the most appropriate manner for each device and each application. By implementing such a mechanism, an enterprise can provide those who wish to access an enterprise network seamless access to the appropriate content for the device.

SUMMARY

There is a need for a method of supporting a plurality of user sessions for a plurality of electronic devices with or without cookie technology and transmitting requests and user session data to an appropriate enterprise server. The present invention is directed toward further solutions to address this need.

In accordance with one example embodiment of the present invention, in an electronic device in communication with a network, a method is provided of supporting a plurality of user sessions for a plurality of electronic devices. The method includes the step of receiving a user request from a client, the user request including distinguishing data. Distinguishing data, as utilized herein, includes information about the client, client device, user, and the like, that can communicate attributes and preferences, and/or identify a particular client, client device, or user. A mapping identifies a session scheme based on the distinguishing data. Then, a user session is established and a session key is established having an association with the user session. The plurality of user sessions can be established utilizing the steps of receiving, mapping, establishing a user session, and establishing a session key, for each user session, and each user session can co-exist with other user sessions.

In accordance with certain aspects of the present invention, the client is one of an application, a browser, and a client electronic device. The step of receiving the user request can further include authenticating the request. The step of receiving the user request can also include determining authorizations for the request.

In accordance with other aspects of the present invention, the step of identifying the session scheme includes examining an HTTP header to identify the type of client making the request. Furthermore, the session key can be, for example, one of a cookie, a mini-cookie, a secure sockets layer identifier, an IP address, a device identifier, and a re-written URL.

In accordance with still another aspect of the present invention, the session key is utilized to locate user sessions in one of a persistent session store, a storage device, and a random access memory, and providing access to the user session corresponding to the session key.

Further aspects of the present invention include forwarding the user request to a second electronic device, receiving a response from the second electronic device, and forwarding the response to the client.

In accordance with yet another aspect of the present invention, an application program interface is utilized to generate at least one API session scheme capable of retrieval of a session key to locate the user session stored in one of a cookie, a persistent session store, a storage device, and a random access memory. An API session scheme can include at least one of a context validation function, a retrieval function, a create key function, a create session function, an update function, and a logout function.

In accordance with further aspects of the present invention, the session key can be one of a cookie, a mini-cookie, a secure sockets layer identifier, an IP address, a device identifier, and a re-written URL. The method can further include utilizing the session key to locate the user session. Utilizing the session key can include locating the user session in one of a cookie, a persistent session store, a storage device, and a random access memory, and providing access to the user session.

In accordance with another embodiment of the present invention, the method further includes forwarding the user request to a second electronic device. A response is received from the second electronic device, and forwarded to the client.

In accordance with further aspects of the present invention, the session scheme is valid for the plurality of user session for the plurality of electronic devices.

In accordance with another embodiment of the present invention, in an electronic device in communication with a network, a method is provided of supporting a plurality of user sessions for a plurality of electronic devices. The method includes receiving a user request from a client. Distinguishing information is extracted from the user request. A session scheme is located that correlates to the distinguishing information. The method either retrieves the session scheme if the session scheme is located, or provides a default session scheme or rejects the user request if no default session scheme is located. The method then obtains a session key as instructed by one of the session key and/or the default session key.

The method, in accordance with one embodiment of the present invention, can further include one of forwarding the user request upon locating a user session utilizing the session key and forwarding the user request after creating the user session in association with the session key.

In accordance with other aspects of the present invention, a uniform resource locator is determined to which the user request is forwarded, where the uniform resource locator indicates an electronic server device configured in a network. Data from the user session can be forwarded to the electronic server device configured in the network. Furthermore, a proxy rule can be executed, wherein the proxy rule analyzes data from at least one of the user request, the user session, and a stored user record, compares at least one property associated with the data to at least one predetermined value, and converts the user request to a new request according to a result of comparing at least one property associated with the data to at least one predetermined value. Additionally, the user session can include data in the form of a user identifier, a preference, authentication data, and a session expiration period.

In accordance with still another embodiment of the present invention, in an electronic device, a method is provided for converting a plurality of incoming requests from a plurality of electronic devices into a plurality of new requests. The method includes reading one of the plurality of incoming requests and comparing at least one property associated with the request to at least one predetermined value, thereby determining a characteristic associated with a user. The one of the plurality of incoming requests is converted to one of the plurality of new requests according to a result of comparing at least one property associated with the request to at least one predetermined value. The one of the plurality of new requests is forwarded to a server device configured in a network, where the server device is determined by comparing at least one property associated with the request to at least one predetermined value. The plurality of incoming requests can be converted and forwarded to the plurality of server devices using the steps of reading, comparing, converting, and forwarding for each incoming request.

In accordance with further aspects of the present invention, the server device formats content for a user. In addition, the characteristic associated with the user includes an attribute in the form of at least one of a device identifier, a content type, a user class, a level of service, a default parameter, a requested host, a requested URI, and a secure response.

According to yet another embodiment of the present invention, a data storage medium stores instructions for configuring a computer. The instructions include receiving a user request from a client. Distinguishing data is extracted from the user request and a session scheme correlating to the distinguishing data may be located or a default session scheme provided. A session key may then be obtained as instructed by one of the session scheme and the default session scheme.

Furthermore, the user request is forwarded upon locating a user session utilizing the session key or after creating the user session in association with the session key. In addition, the instructions further include the steps of executing a proxy rule. The proxy rule determines an electronic device to receive the user request.

BRIEF DESCRIPTION OF THE DRAWINGS

The aforementioned features and advantages, and other features and aspects of the present invention, will become better understood with regard to the following description and accompanying drawings, wherein:

FIG. 9 is an example of an intelligent proxy rule in accordance with one aspect of the present invention.

DETAILED DESCRIPTION

Figure 1:
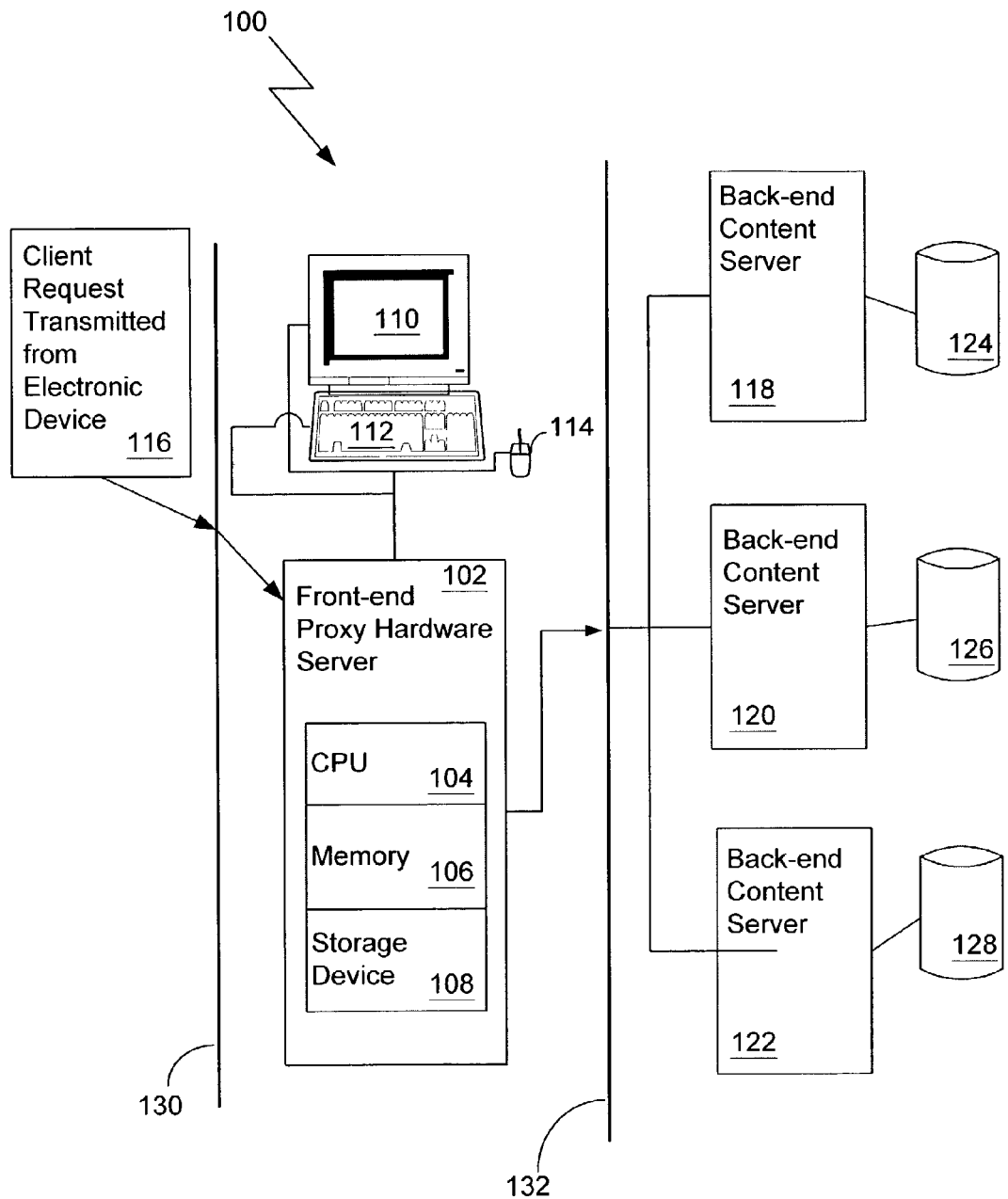
FIG. 1 is an illustration of an enterprise network in accordance with one aspect of the present invention.

An illustrative embodiment of the present invention relates to an enterprise network with access control for generic HTTP/HTTPS requests from Internet/extranet and intranet users. The present invention, hereinafter referred to generally as the proxy server, contains a configurable mechanism that creates a mapping between a set of headers in a user request (e.g., specific device identifiers) and session schemes that prescribe how to obtain a session key. Using the session key, a user session may be obtained. An extendible session scheme application program interface (API) is provided for creating custom session schemes to obtain additional types of session keys or to obtain session keys using techniques that differ from those techniques used by available session schemes. The extendible session scheme API may allow for requests to be serviced from currently available devices, in addition to allowing for requests to be serviced from devices that become commercially available in the future. The proxy server provides a manageable, reliable, scalable, and efficient means to manage session data and requests for all devices used to access information from an enterprise's web site.

FIGS. 1 through 9, wherein like parts are designated by like reference numerals throughout, illustrate example embodiments of the proxy server and method according to the present invention. Although the present invention will be described with reference to the example embodiments illustrated in the figures, one of ordinary skill in the art should understand that many alternative forms can embody the present invention. One of ordinary skill in the art will additionally appreciate ways to alter parameters of the embodiments disclosed, in a manner still in keeping with the size and scope of the present invention.

FIG. 1 illustrates a computer hardware configuration of an enterprise network 100 formed of example embodiments of electronic devices. Electronic devices suitable for practicing the illustrative embodiment of the present invention are representative of a number of different technologies, such as personal computers (PCs), laptop computers, workstations, personal digital assistants (PDAs), Internet appliances, mobile telephones, and the like. Electronic devices include a central processing unit (CPU) and may include a display device. The display device allows an electronic device to communicate directly with a user through a visual display. The electronic device may also include input devices such as a keyboard, mouse, stylus, trackball, joystick, touch pad, touch screen, and the like. The electronic device typically includes primary storage and secondary storage for storing data and instructions. The storage devices can include such technologies such as a floppy drive, hard drive, tape drive, optical drive, read-only memory (ROM), random access memory (RAM), and the like. Applications such as browsers, JAVA virtual machines (JAVA is a trademark and/or registered trademark of Sun Microsystems, Inc. of Mountain View Calif., in the United States and other countries), and other utilities and applications can be resident on one or more storage devices. The electronic device often includes a network interface for communicating with one or more electronic devices external to the electronic device. A modem is one form of establishing a connection with an external electronic device or network. The CPU has attached thereto, either internally or externally, one or more of the aforementioned components.

An electronic device, such as front-end proxy hardware server 102, receives a client request transmitted from an electronic device 116. The front-end proxy hardware server 102 generally contains a CPU 104 containing one or more processors, memory 106, and at least one storage device 108, among other computer components such as a monitor 110, a keyboard input device 112, and a mouse input device 114. The front-end proxy hardware server 102 runs an operating system, such as a WINDOWS series operating system offered by MICROSOFT CORPORATION, or a UNIX operating system such as one offered by UNIX SYSTEM LABORATORIES, INC., and the like. Furthermore, the front-end proxy hardware server 102 may have a variety of software programs installed on the storage device 108 that may be executed by the CPU 104. One such software program may implement parts of the invention described herein. The keyboard 112 and mouse 114 may be used to interact with, or configure, a software program, which may display a user interface for such interaction and configuration on the monitor 110. One of ordinary skill in the art will appreciate that there are a number of different hardware and software configurations possible for the front-end proxy hardware server 102.

Other electronic devices in the form of back-end content servers 118, 120, and 122 interface to the front-end proxy hardware server 102. The back-end content servers 118, 120, and 122 can contain conventional hardware, including a CPU, memory, and storage device, and may further include other computer components, such as a monitor, a keyboard input device, a mouse input device, and the like. The back-end content servers 118, 120, and 122 may run applications that provide products and services to users that access the back-end content servers 118, 120, and 122. Additionally, database systems 124, 126, and 128 may be interfaced to the back-end content servers 118, 120, and 122 to provide data to software programs and to the various applications.

Application servers (not shown) contain additional application software programs and can be integrated with or interfaced to the back-end content servers 118, 120, and 122 to provide additional resources.

The enterprise network 100 may include other hardware and software components as well. For example, first firewall 130 and second firewall 132 may be configured to prevent unauthorized access to the enterprise network. The first firewall 130 and the second firewall 132 may be implemented in hardware, in software, or as a combination of hardware and software. The first firewall 130 may be configured such that the first firewall 130 intercepts the client request transmitted from an electronic device 116 before the client request transmitted from the electronic device 116 reaches the front-end proxy hardware server 102. The second firewall 132 may be disposed between the front-end proxy hardware server 102 and back-end content servers 118, 120, and 122 as an additional security measure.

One of ordinary skill in the art will appreciate that FIG. 1 illustrates only one example front-end proxy hardware server 102, for the sake of clarity. However, due to the number of users accessing an enterprise network, typical enterprise networks have a cluster of front-end servers that handle user requests for access to the web site. In addition to centralized access control, a front-end server cluster provides load balancing capabilities. Load balancing functions are implemented by one or more network switches (not shown) and determine which front-end server in the cluster will receive the user request. Furthermore, the front-end server cluster acts as a fault tolerant mechanism because access to the enterprise network is not affected if one front-end server in the cluster becomes inoperable. In one implementation, rather than the front-end proxy hardware server 102 providing load balancing functions, other load balancing servers may be placed in front of, or in some cases behind, the front-end proxy hardware server 102, and will load balance requests around a cluster of front-end proxy hardware servers.

The proxy server may be configured as a software interface between the enterprise network 100 and all gateways and all devices transmitting information to and receiving information from the enterprise network 100. Residing on a front-end hardware server, such as front-end proxy hardware server 102, the proxy server receives a request to access the enterprise network 100 when the request is transmitted to the front-end hardware server. The proxy server contains data used to identify numerous wired and wireless devices, as will be discussed. All requests are typically funneled through the proxy server, where security decisions about the requests are made, before approved requests are forwarded to applications on back-end content servers, such as back-end content servers 118, 120, and 122.

The proxy server may maintain a mapping called proxy rules (further described below) that map HTTP/HTTPS requests transmitted to the proxy server to locations (e.g., URLS) of back-end servers in the enterprise network to which the requests are forwarded. Typically, the firewall 132 is positioned between the front-end proxy hardware server 102 and back-end servers 118, 120, and 122, and prevents the back-end content servers 118, 120, and 122 from being accessed directly by client devices. Thus, the only means for a back-end content server to communicate with a client device may be through the proxy server. Having requests to back-end content servers occur only through the proxy server strengthens the security of the enterprise system because the configuration of the computer systems in the enterprise network may be concealed from the user and unapproved requests never reach the physical devices that are the back-end content servers.

Back-end content servers that receive a request from a proxy server, such as the back-end content servers 118, 120, and 122, respond to the request. The proxy server may add session data to the response, then may return the content to the client that invoked the request.

Figure 2:
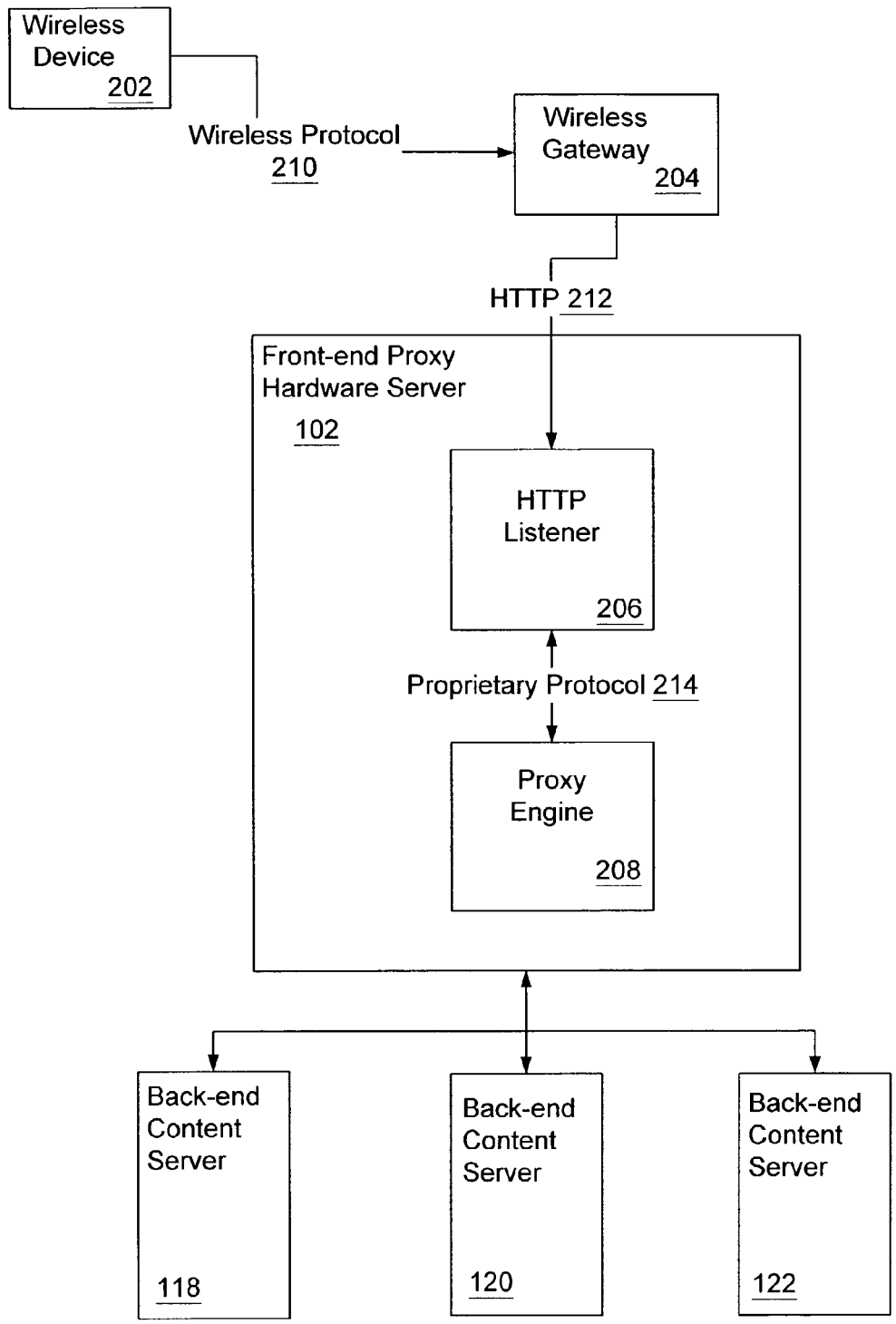
FIG. 2 is an illustration of a transmission of a request in accordance with one aspect of the present invention.

FIG. 2 is an illustration of a client request as the request flows from a wireless device 202 to a proxy engine 208 executing on a front-end proxy hardware server 102. The wireless device 202 transmits a wireless request when attempting to access an enterprise network via the Internet or the enterprise's extranet. The wireless request is packaged as a wireless protocol 210. The request is received by a wireless gateway 204, possibly managed by the vendor of the wireless device 202. The wireless gateway 204 formats the request as an HTTP request 212 (or possibly an HTTPS request), and transmits the request to the HTTP listener 206. The HTTP listener 206 can repackage the request as a proprietary protocol 214, or the HTTP or HTTPS protocol. The HTTP listener 206 then transmits the request to the proxy engine 208. The proxy engine 208 then transmits the request to a back-end content server, such as back-end content server 118, 120, or 122.

Although FIG. 2 contains an illustration of a wireless device, a wired device may transmit a request packaged as an HTTP or HTTPS request directly to the HTTP listener 206 or through a gateway device. Moreover, requests from all wired and wireless devices with and without support for cookies may be transmitted directly to the HTTP listener 206. Additionally, the HTTP listener 206 may be configured to accept requests from Internet/extranet as well as intranet clients.

Some enterprises regard storing user-specific information (e.g., user identifier, preferences, authentication data, and a time-out period), as necessary or convenient. Such user-specific information (referred to as a user session or simply a session) provides a means by which to hold the state of a client device communicating via an Internet/extranet or intranet. A web-based application may obtain the session and may use the data encapsulated in the session for security or customization processes. If the client device is unable to store the session, the gateway may store the session for the device. For a variety of reasons it may be difficult or undesirable to store session information on the client or a gateway device. As an alternative, the proxy server can be configured to store sessions in random access memory (i.e., RAM) session store or in a persistent session store configured in the enterprise network, and then link a unique user to that user's unique session in the session store through a number of mechanisms.

The proxy server provides a flexible management model supporting any client device. In addition to a RAM or persistent session store used for cookieless sessioning, the proxy server embodies a configurable mapping mechanism. The configurable mapping mechanism maps data in a header of a request (e.g., a client device type) to a session scheme on a per virtual server basis. Applications are often set up behind the proxy server on a per virtual server basis as well. The session scheme is then used to obtain a session key that is utilized to establish, maintain, and retrieve a user session. The technique that is appropriate for obtaining a session key may be dependant on the user device accessing the application, on other data contained in the header of the request, and on the application itself whose design along with the application's security and performance needs may require a certain session key over another.

A session scheme may ascertain that a cookie is both a session key and a session storage mechanism. When a cookie is a session storage mechanism, the session can be stored on a client device or a gateway in a cookie. Otherwise, the session scheme is stored in RAM or the persistent store. Additional session schemes identify data embedded in a request as a session key and use the session key to lookup a user session stored in RAM or the persistent session store. Data in the user session can then be forwarded with a request to the appropriate URL so that the content returned to the client is in a suitable format for the device. Multiple session schemes are available to support simultaneous sessions for tracking multiple users who are communicating with an enterprise network via a variety of electronic devices. The configurable mapping mechanism is extendible, using the extendible session scheme API, by allowing session schemes to be added as needed, for example, when new devices become available on the market.

An access device identifier, contained in an HTTP header of a client request, distinguishes the electronic device that is invoking the request. The access device identifier can identify the client software (e.g., the browser used by the device) and identify a device type. The device type may include a vendor name and a version of the product that is the device. A gateway system that proxies a request may add data to the access device identifier to designate the gateway system. In one embodiment, the access device identifier is the HTTP header variable "user-agent," which specifies the browser and/or device making the request, and a one-to-one mapping is implemented between the "user-agent" header variable and a session scheme.

The proxy server may read the access device identifier in the HTTP header(s) to determine the behavior of the device seeking access. The access device identifier can be used to locate the session scheme that is appropriate for the electronic device. The session scheme then dictates how to create or maintain the session key in the response to the client device, or how to retrieve the session key from the client device if a session has already been established.

The present invention may utilize other data in a request in addition to or in place of an access device identifier. Generally, any differentiating data in the header can map to a session scheme. For example, a request can contain data that distinguishes a country of origin. Certain countries may not allow cookies to be transmitted to devices located in the country. In this case, the present invention can recognize the country of origin (or a language used by the device transmitting the request) and utilize a session key other than a session key that is a cookie.

In one embodiment, session schemes are utilized to enable the proxy server to retrieve user sessions using cookies, mini-cookies, Secure Sockets Layer (SSL) session IDs, Internet Protocol (IP) addresses, device IDs, and rewritten URLs as session keys. Data in a cookie may contain a user session and can be stored in a device or gateway system known to accept cookies, whereas data in a mini-cookie can contain a key to a session in RAM or the persistent session store, for example, because a device is constrained by memory or a device employs a gateway system that accepts cookies on a smaller scale (e.g., WAP gateways). The session key for a mini-cookie can be generated using a device ID, IP address, or random bytes. A device ID can be used as a key to retrieve a user session from RAM or the persistent session store when an access device includes a unique device ID in the HTTP header of the client request. An IP address can uniquely identify a user in some environments, and therefore, may be used as a key to retrieve a user session from RAM or the persistent session store. For electronic devices that communicate via the SSL protocol (developed by NETSCAPE COMMUNICATIONS CORPORATION of Mountain View, Calif.), an SSL ID from an HTTPS connection may be used as a key to retrieve a user session from the RAM or persistent session store.

Two additional session schemes may be implemented. The first redirects a user after authentication to a new URL that includes the session key at the base of the file component of the URL. The second additional session scheme utilizes a rewritten URL to obtain a session key for a user session. The URL rewriting scheme modifies outbound content by inserting a session identifier on all URL references returned to a client, as will later be discussed. The session identifier can also be encrypted by the session scheme. A device ID, SSL ID, or other identifier may also be incorporated in the session key to augment the URL rewriting scheme.

When a request from an unknown device is transmitted to the proxy server, a default session scheme can be used to map the unknown device to a user session. Additionally, the default session scheme can be used when multiple session schemes are not required.

The session scheme mechanism enables the proxy server to support simultaneous sessions for various devices in order to track users. Due to this capability, cookieless sign-on to a resource in an enterprise network and multiple methods of cookieless sessioning are available.

In one embodiment, the session schemes may be implemented using an object-oriented software programming language, such as C++, JAVA, and the like. In an object-oriented software program, a class defines a set of objects that have similar data structures. A class can also define one or more methods that are procedures. An object is created by instantiating a class.

A class can have derived classes. A derived class inherits characteristics from the class from which it is derived; however, a derived class may also redefine properties and characteristics defined in the class from which it is derived. A derived class may also have additional properties and characteristics. In one embodiment, all session schemes are derived from the same base class. One of ordinary skill in the art will appreciate that the present invention can be implemented using other programming techniques as an alternative to object-oriented programming.

In accordance with one embodiment, the present invention provides a JAVA-based extendible session scheme API to enable users to write and deploy additional session schemes. Therefore, if an available session scheme cannot be used to obtain a session key for a device (or other distinguishing data), an appropriate session scheme may be customized for the device (or other distinguishing data). After the new custom session schemes are written/created using the JAVA-based extendible session scheme API, the session schemes may be deployed on a server through the session scheme configuration in an Extensible Markup Language (XML) file. This capability for writing and deploying additional schemes enables the session scheme mapping mechanism to scale as needed for additional electronic devices, user requirements, and web applications.

The JAVA-based extendible session scheme API consists of a series of callback functions for handling session events. Callback functions include a context validation callback, a retrieval callback, a create key callback, a create session callback, an update callback, and a logout callback.

A context validation callback verifies that the proper context exists in the client request to retrieve or create a session key. For example, the SSL session ID scheme verifies that the user device transmitting the request is communicating using SSL. A retrieval callback extracts the session key from the request context. A create key callback may generate the key that will be associated with the user's session in the session store. A create session callback is an event called when the session is created and provides an opportunity to add a newly created session key to the outbound response context, such as in a cookie or to redirect the request for example by re-writing the URL.

An update callback is an event called when an existing session is presented again and may add an updated session key to the outbound response context (e.g., for encryption purposes). The logout callback removes the session key from the user's environment via the outbound response after the user indicates that the session be terminated, thus ensuring that the session key is valid for one session only.

As previously discussed, the session schemes may be mapped on a per virtual server basis to an access device identifier, such as the HTTP "user-agent" header variable. Mapping of an access device identifier may be specific for particular servers, adding additional flexibility to the session management model. For example, the device ID session scheme may be mapped to a given access device identifier for a particular server to provide greater session persistence than may be obtained using the URL rewriting scheme. However, the URL rewriting scheme may be mapped to the access device identifier for a different server to provide greater security.

Figure 3:
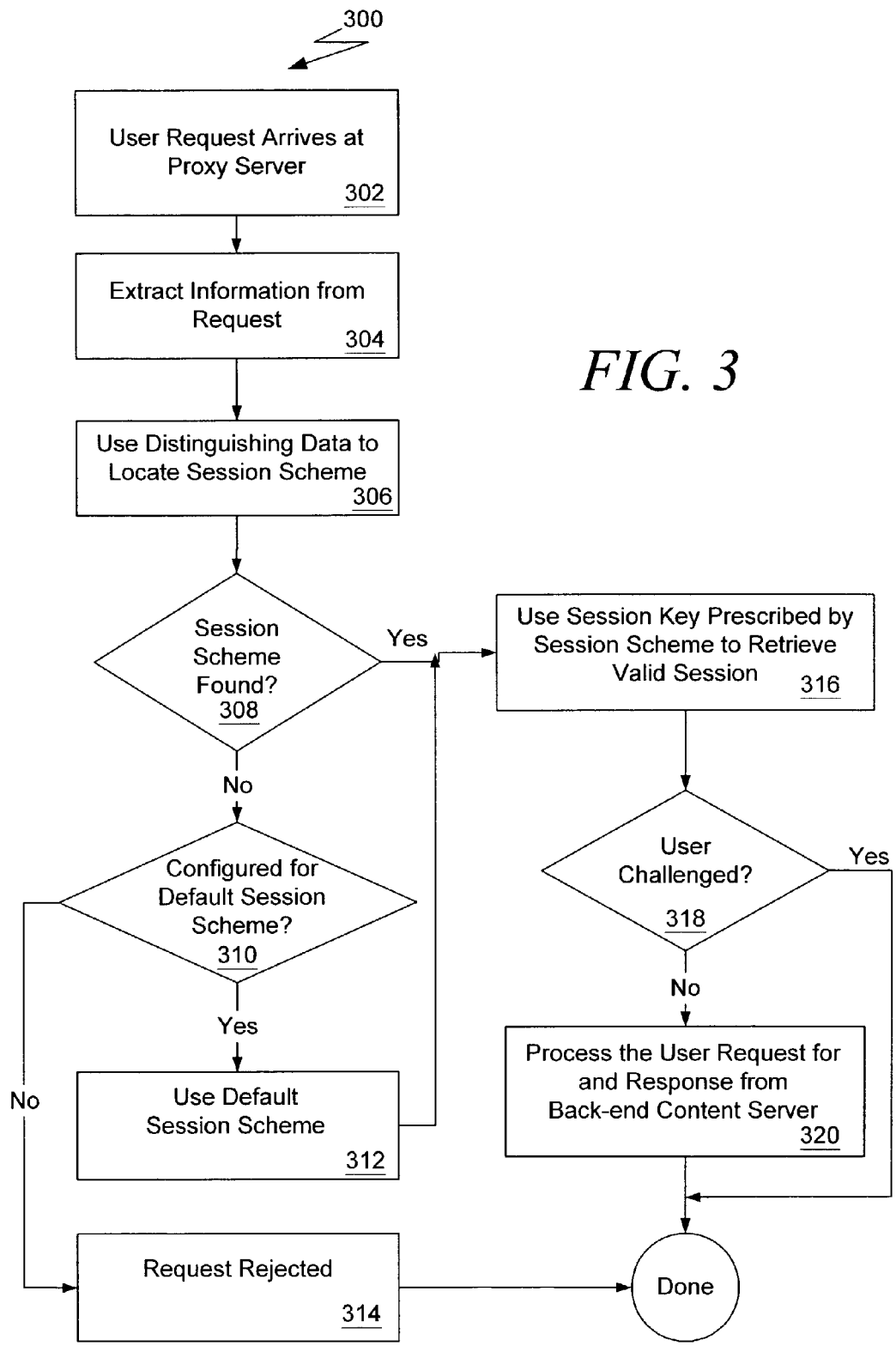
FIG. 3 is a flowchart of a process that handles a user request in accordance with one aspect of the present invention.

Referring to FIG. 3, a flowchart 300 shows an overview of a process that receives a user request, directs the request to the appropriate back-end content server, and may return a response to the client that made the request. First, the user request arrives at the proxy server (step 302) from a client, such as an electronic device and/or software application. The proxy server extracts information from the request (step 304) to obtain distinguishing data (e.g., the access device identifier) which is then used to locate a session scheme (step 306). The process then determines if a session scheme was found for the device making the request (step 308). If a session scheme was not found, the process checks whether the proxy server is configured to provide a default session scheme (step 310). If the proxy server is configured for a default session scheme, the default session scheme is used (step 312); otherwise, the request is rejected (step 314).

If a session scheme was found (in step 308) or if a default session scheme is to be used (step 312), the proxy server attempts to use a session key prescribed by the session scheme to retrieve a valid session for the user making the request (step 316). In some implementations, a user can be challenged for credentials. A user may be challenged if a session key was not found, if a session key was found but cannot be associated with a valid user session, or if the user session is valid but the user is not authorized to make the request. The proxy server determines if the user is being challenged (step 318), and if so, the process completes because the user must provide more information before access to the enterprise network is permitted. A user's credentials may include a digital certificate obtained from a certificate-issuing authority (e.g., VeriSign, Inc. headquartered in Mountain View, Calif.), a username and a password, or additional information known only to the user and the authentication process (e.g., a personal identification number, known as a PIN).

If the user is not being challenged for credentials, the request is processed and forwarded to the appropriate back-end content server, then the response to the request from the back-end content server is processed (step 320). Processing the request and response may simply entail transmitting the request and response unchanged, and may involve more complex operations, such as inserting additional HTTP headers into the inbound request or inserting a new session key into the outbound response. A set of intelligent proxy rules may be executed for the purpose of repackaging the request, as will be discussed.

Figure 4:
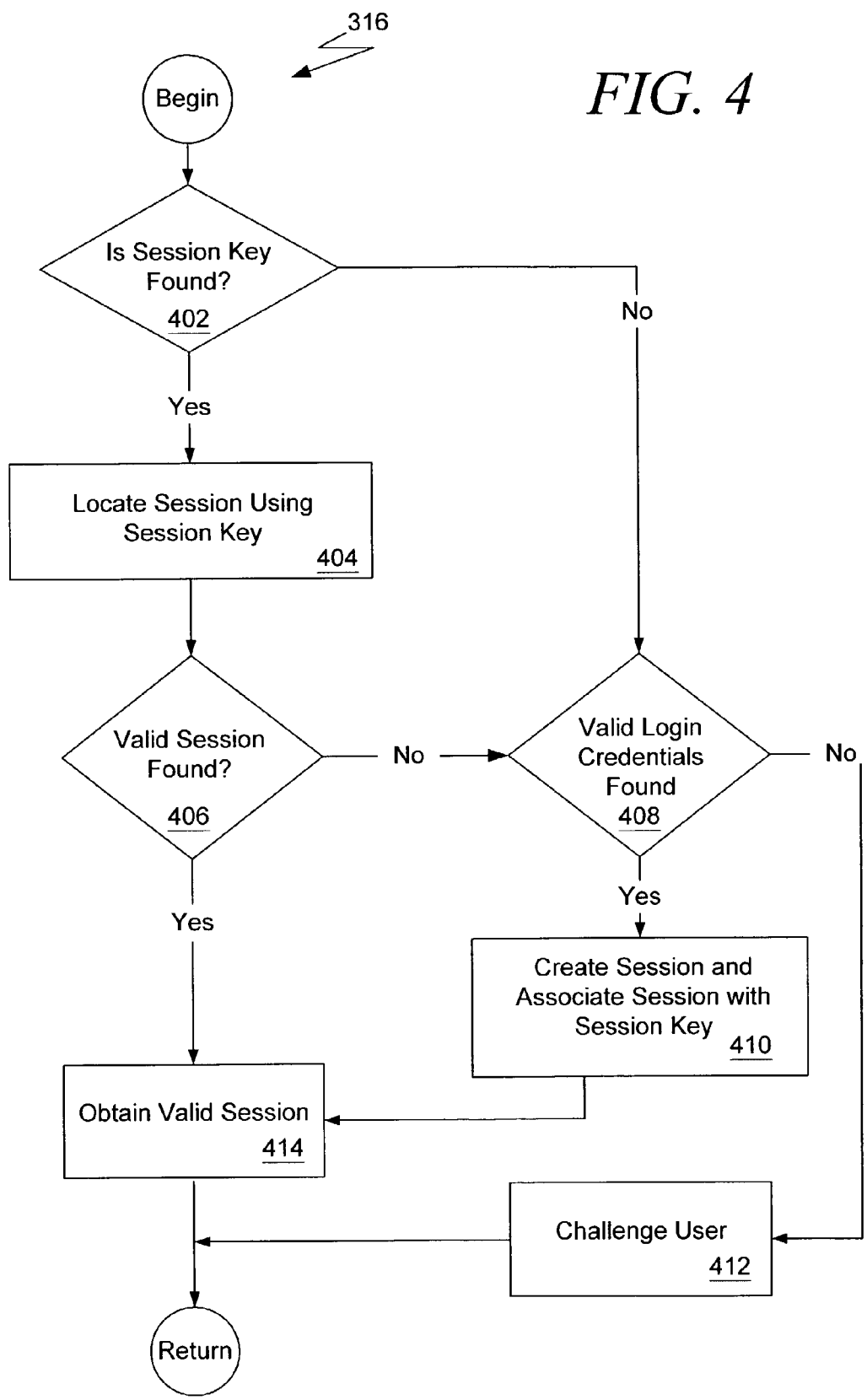
FIG. 4 is a flowchart of a procedure for obtaining a session in accordance with one aspect of the present invention.

Referring to FIG. 4, a flowchart describes in greater detail step 316 in FIG. 3, that is, the process performed by the proxy server to retrieve a valid session for the user making the request. First, the process determines whether a session key was found (step 402). If a session key was found, the session key is utilized to locate a session in a cookie, in RAM, or in the database that functions as a persistent session store (step 404). The process then checks whether a valid session was found, that is, whether a user session in a cookie or user session from the session store was obtained (step 406).

In one embodiment, if a session key was not found or a valid session was not found, the process attempts to locate valid login credentials for the user (step 408) by using data that identifies a user to search a database that contains user credentials. If login credentials were found, a session is created for the user and the session is associated with a session key (step 410). If login credentials were not found, the user is challenged to provide credentials (step 412), in which case, the request will not be forwarded to a back-end content server. Challenging the user for credentials may occur the first time a user accesses an enterprise network. Another embodiment may not require a user to provide credentials and allow unconditional access to all back-end content servers.

The final step in FIG. 4 may occur after a valid session is found (step 406) or after a session is created and associated with a session key (step 410). In each instance, the final step is to obtain a valid session (step 414).

The proxy server can be implemented as a number of servlets, which are software modules that are executed within a software server program. In one embodiment, the servlets are contained within the open source TOMCAT software server available from APACHE SOFTWARE FOUNDATION. The TOMCAT server operates as a JAVA Servlet container for the proxy server servlets.

Figure 5:
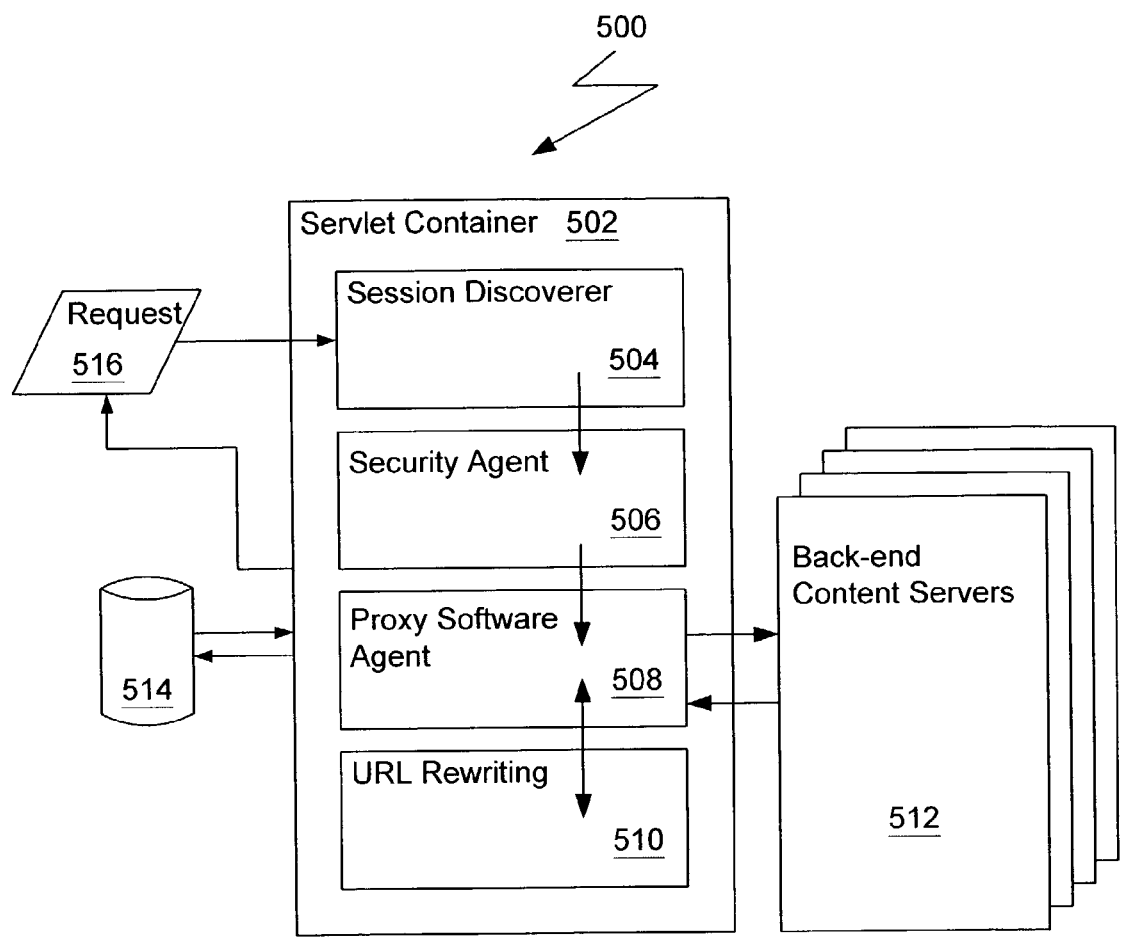
FIG. 5 is an illustration of a proxy server in accordance with one aspect of the present invention.

FIG. 5 is an illustration of a configuration of a proxy server 500. A servlet container 502 provides a software framework for implementing and holding one or more servlets. The servlet container 502 and servlets (504, 506, 508, and 510) may be implemented in the JAVA, C++, or other programming languages. A request 516 to the enterprise network is intercepted by a session discoverer servlet 504 contained in the servlet container 502. The session discoverer servlet 504 implements a mapping process. The mapping process, as previously discussed, uses distinguishing data (e.g., the access device identifier that specifies the client device from which the request 516 was invoked) to obtain an appropriate session scheme. The session scheme may use a cookie as both a session key and a session storage mechanism, in which case, the cookie contains the session. If a cookie is a session key but not a session storage mechanism, the session scheme locates the user session in the persistent session store 514 or in RAM. If a cookie is not a session key, the appropriate session scheme extracts a session key from the request and locates the user session in the persistent session store 514, or alternatively, in RAM.

A security agent 506 can be contained in the servlet container 502. The purpose of the security agent 506 is to create, add, and validate a session. Performing the functions of creating, adding, and validating a session require access to RAM or the persistent session store 514. A session is validated for a requested uniform resource identifier (URI), for example, by authenticating and authorizing the user. One embodiment of the present invention uses the SITEMINDER computer program, available from NETEGRITY INC. of Waltham, Mass., as the security agent 506. The security agent 506 can be principally responsible for managing access control for the entire enterprise. In one embodiment, the security agent 506 is a plug-in; however, rather than a plug-in, the software may be a tightly integrated software module within other software components of the proxy server 500.

A proxy software agent 508 receives the request from the security agent 506. However, in one implementation, the session discoverer servlet 504 and the security agent 506 can be coupled such that if one is missing or disabled, both are missing or disabled. In this case, the proxy software agent receives a request 516 directly and implements the session scheme mapping process, in addition to creating, adding, and validating a session.

The proxy software agent 508 forwards the request to back-end content servers 512, and may also transmit the user session or parts thereof. The back-end content server 512 to which the request is forwarded is determined by a set of intelligent proxy rules. The intelligent proxy rules are a set of instructions that specify which URL and server is the destination for the request, which will be discussed.

The proxy software agent 508 autonomously carries out the task of delivering session content. The proxy software agent 508 may also carry out other tasks, such as creating and maintaining session content, in addition to authenticating a user and authorizing user access, if the security agent 506 is not present.

After receiving and processing the request, the back-end content server 512 that serviced the request sends content back to the proxy software agent 508. The proxy server 500 can then send the content to the client from which the request was initially invoked.

If the session discoverer servlet 504 (or if absent, the proxy software agent 508) determined that the appropriate session scheme for the user client was the URL rewriting session scheme, the content is sent to the URL rewriting servlet 510. The URL rewriting servlet 510 examines the URL links in the content. The URL links may include anchor tags, IMG tags, and form location. The URL links are rewritten to include a session key that can subsequently be used to retrieve the user session.

As discussed, due to security risks, minimal storage capabilities, and other reasons, session information may need to be stored somewhere other than in the client device that is invoking a request to the enterprise network. To meet this need, the proxy server 500 can use RAM or be interfaced to a repository for persistent storage of session information 514. The repository for persistent storage of session information 514 may reside on the same or on a different computer in the enterprise network than the proxy server 500. The proxy server 500 accesses RAM or the persistent storage 514 via a session storage API.

The session storage API is utilized to manage the sessions stored in RAM or the persistent storage 514. The session storage API enables a user session to be created and updated. Additionally, the session storage API allows for the retrieval of a user session using a session key. A session may also be removed using a session key via the session storage API. Furthermore, the session storage API enables all expired sessions to be removed.

The session storage API works in conjunction with the extendible session scheme API, which was previously discussed. For example, a session scheme API function retrieves the session key from a client request. Then, via the session storage API, RAM or the persistent storage 514 is queried using the session key and the session may be updated. The session scheme API then resumes control and may modify the response, for example, with a new encrypted cookie.

Another aspect of the invention repackages the request as a new request to accommodate various applications hosted on different back-end content servers. This aspect of the invention is referred to as the intelligent proxy rules. The intelligent proxy rules are executed during step 320 in FIG. 3, and discussed in more detail with reference to FIG. 6.

Intelligent proxy rules enable the proxy server to determine to which URL the request should be forwarded for a given request and can take into account the device that initiated the request. The intelligent proxy rules convert the URL of the original request to a re-packaged request that represents a full URL. In addition to using a URL of an original request, the conversion logic can consider additional HTTP header information from the original request and information about the user making the request obtained when the user is authenticated. The full URL can designate a resource specifically designed to format content for a particular device (e.g., a PDA or Web-enabled mobile phone). The re-packaged requests are then transmitted to the appropriate back-end content servers in the enterprise network.

Figure 6:
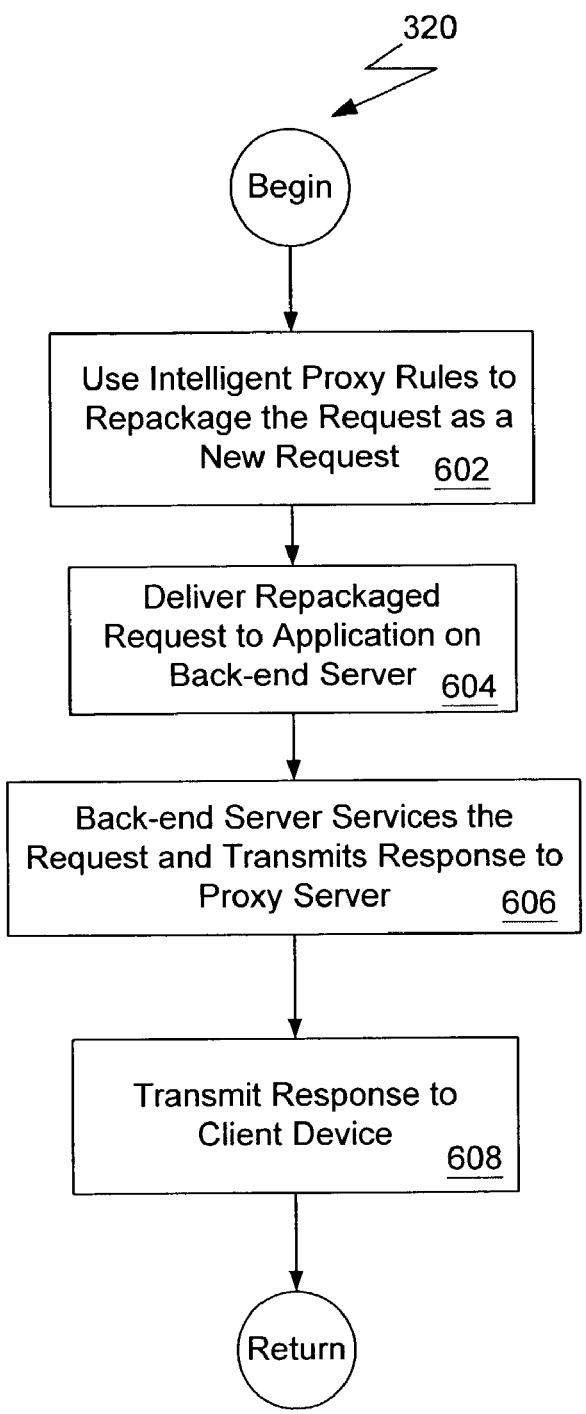
FIG. 6 is a flowchart of a procedure for processing a request in accordance with one aspect of the present invention.

Referring now to FIG. 6, the proxy server uses the intelligent proxy rules to re-package the request as a new request (step 602). The re-packaged request contains an internal URL to locate the appropriate back-end content server. The internal URL directs the request to the appropriate application (e.g., an application that handles requests from a particular device or an application that handles requests from a particular class of users). Additionally, the internal URL is a security mechanism that conceals the identity of the back-end content server from electronic devices that access the enterprise network. The re-packaged request is delivered to the appropriate application installed on the back-end content server (step 604). The back-end content server services the request and transmits a response to the proxy server (step 606). As a final step, the response is transmitted to the client device (step 608).

Generally, one or more conditions must be met before an operation is executed by the intelligent proxy rules. The conditions define which properties in the original request should be evaluated by comparing a certain property associated with the request to a given predetermined value. By associated with the request, what is meant is related in some way to the request, for example, data sent with the request, data in a user session, other user data which may be stored in a database, or some other data having a relation to the user or requesting device. Properties include URI substrings, server names, access device identifiers, and content types. Additionally, one embodiment evaluates properties obtained from user information from a SITEMINDER computer program after the user is authenticated and authorized to determine, for example, the standard of service to which the user is entitled. Other properties that can be evaluated are obtained from a user session or user data stored elsewhere in the enterprise network. Criteria defines how the properties will be evaluated, for example, whether what is being evaluated equals a given predetermined value, begins with a given predetermined value, ends with a given predetermined value, has a substring of a given predetermined value, or satisfies a given regular expression. Customized and dynamic conditions can also be created using an API. The intelligent proxy rules also support nested conditions and defaults for further versatility.

Figure 7:
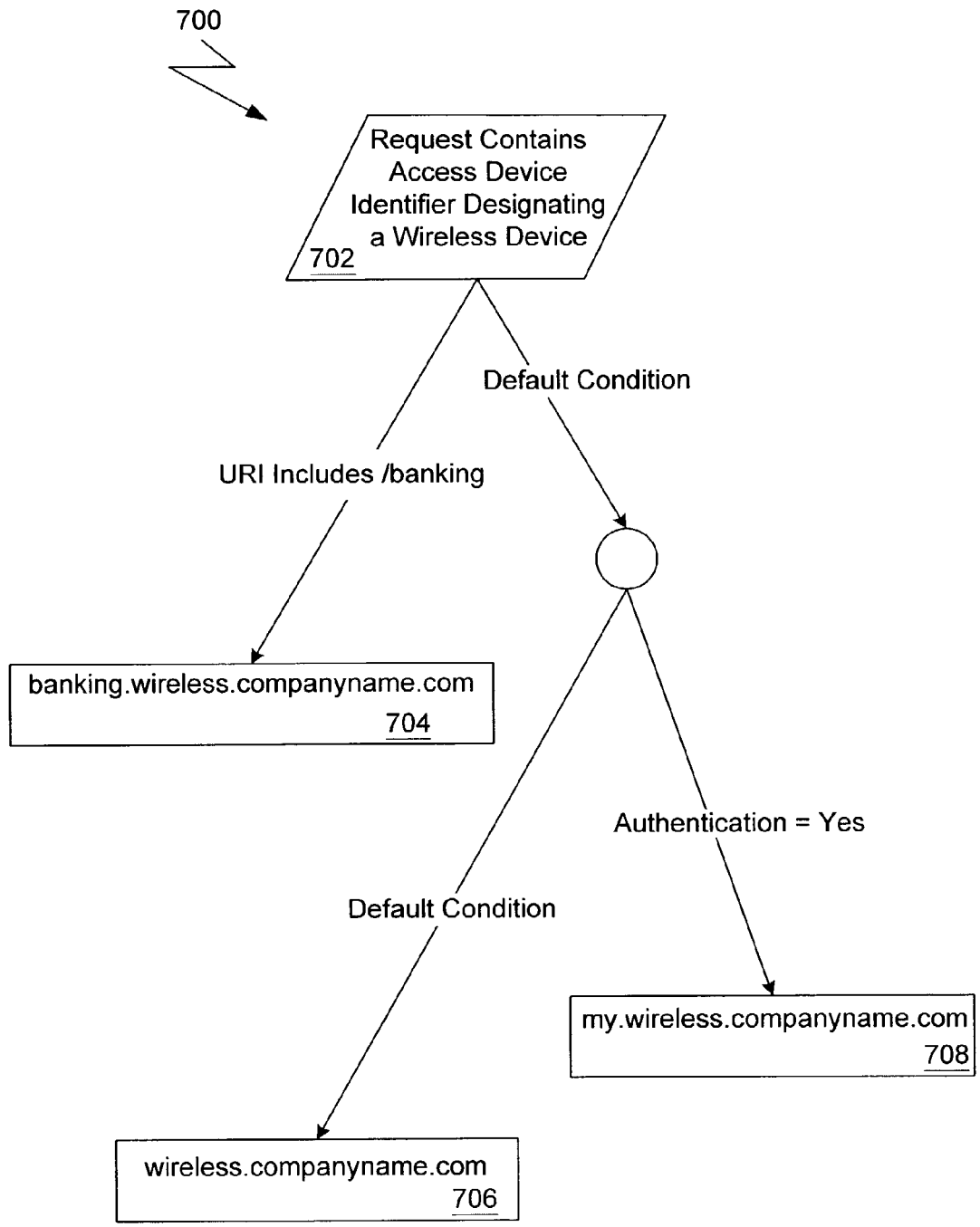
FIG. 7 is an illustration of a decision tree for handling a request in accordance with one aspect of the present invention.

FIG. 7 is an illustrative example of an intelligent proxy rule decision tree 700. The decision tree 700 is a subtree of a larger proxy rule decision tree, where the determination has been made that the user is a wireless user. The manner by which properties of the original request are evaluated are depicted as the branches of the decision tree 700. The URLs to which an intelligent proxy rule may forward a request are depicted as the leaves of the decision tree 700. One of ordinary skill will appreciate that the specific URLs discussed herein are merely example URLs and the present invention is in no way limited to use with the described URLs.

In the illustrative example, the intelligent proxy rules recognize that a request contains an access device identifier that designates a particular wireless device 702. The intelligent proxy rules interpret the URI included in the request. If the URI includes, in the example, the text "/banking," the request is sent to the resource identified by the URL banking.wireless.companyname.com 704. All requests that do not satisfy any other cases defined within a condition are considered default conditions. In this case, all URLs that do not have a substring "/banking" are considered default conditions. When a default condition is triggered, in the example, the intelligent proxy rules check whether the user was authenticated. As illustrated in FIG. 7, if the user was authenticated (e.g., the authentication variable matched the string "Yes"), the request is sent to the resource identified by the URL my.wireless.companyname.com 708. If a default condition was triggered because, for example, the user was not authenticated or the intelligent proxy rules did not find an authentication variable to evaluate, the request is sent to wireless.companyname.com 706.

Figure 8:
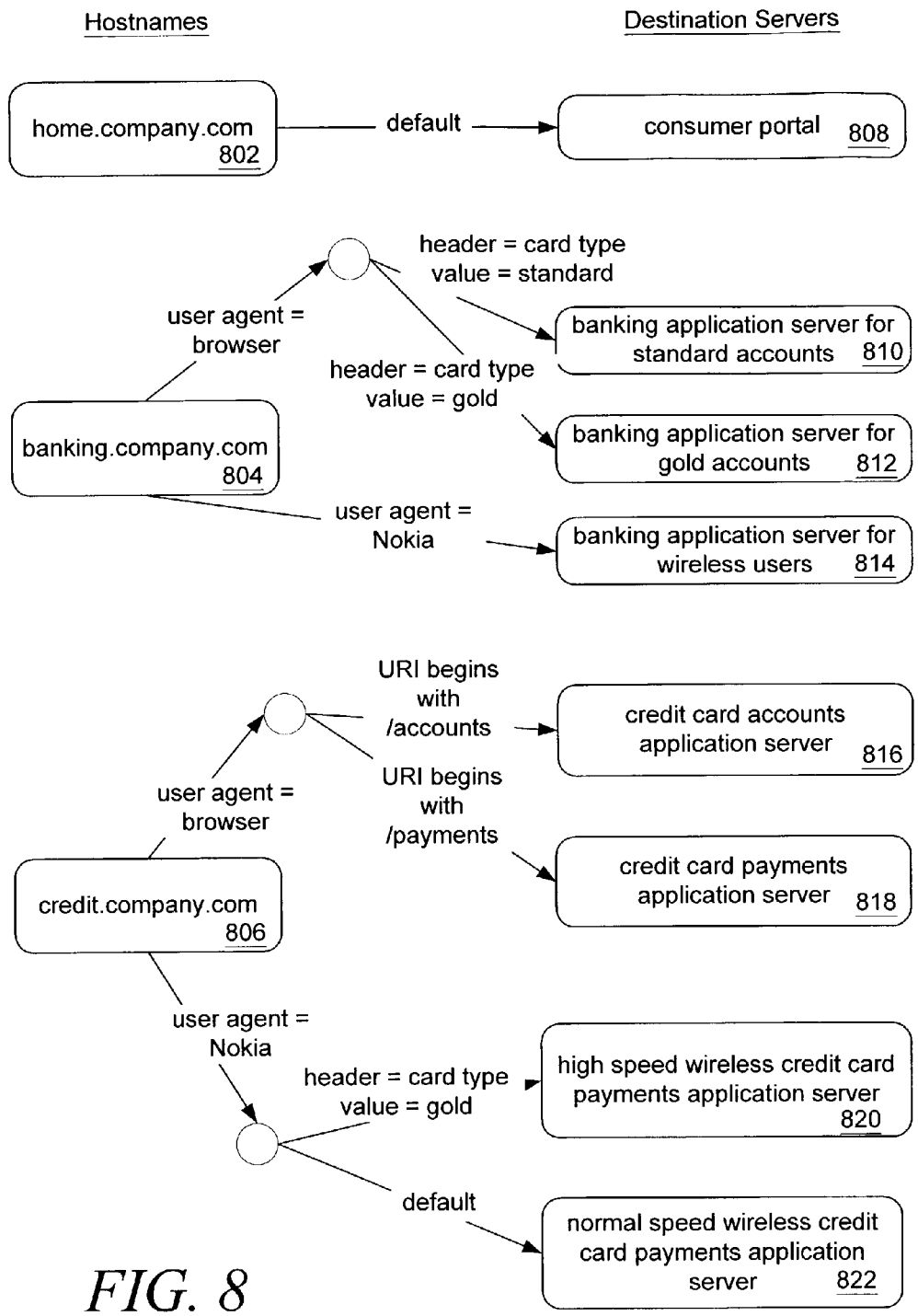
FIG. 8 is an illustration of a decision tree showing different scenarios for handling requests in accordance with one aspect of the present invention.

FIG. 8 is an example that illustrates the mapping of a hostname to a destination server as a result of executing one or more intelligent proxy rules. As a result of evaluating a property in the incoming request using a set of criteria defined in the proxy rules, the incoming request is converted to a new request and transmitted to a destination server. The user need not be aware of the destination server, thereby shielding the identity of the destination server from the user.

The hostname in the incoming user request may be home.company.com 802. If the intelligent proxy rules fail to match properties in the incoming request, a default new request may be supplied that transmits the incoming user request to a destination server that functions as the consumer portal 808.

The incoming user request may contain the hostname banking.company.com 804. In this case, the reverse proxy rules compare the user agent to various predetermined values. If the user agent matches "Nokia," the incoming user request is converted to a new request and transmitted to a destination server that handles the banking application for wireless users 814. If the user agent matches a criterion that specifies a browser, a reverse proxy rule evaluates the header and value properties. If the user is only entitled to a standard level of service (i.e., the type value equals "standard") the incoming user request is converted to a new request that is transmitted to a destination server that handles the banking application for standard accounts 810. If the user is entitled to a higher level of service, for example by being considered a "credit card gold customer," the incoming user request is converted to a new request that is transmitted to a destination server that handles the banking application for gold accounts 812.

The incoming user request may contain the hostname credit.company.com 806. In this case, the conversion of the incoming user request depends upon whether the user agent specified a wired device (e.g., a browser) or a wireless device (e.g., a NOKIA device—NOKIA is a trademark of NOKIA CORPORATION of Finland). In FIG. 8, if the incoming user request contains a user agent property associated with the request that specifies a browser and the URI begins with the string "/accounts," the incoming user request is converted to a new request that is transmitted to a destination server that handles credit card accounts 816. If the incoming user request contains a user agent property associated with the request that specifies a browser and the URI begins with the string "/payments," the incoming user request is converted to a new request that is transmitted to a destination server that handles credit card payments 818. Alternatively, if the user agent specifies a wireless device, such as a NOKIA device, the intelligent proxy rules compare the header in the incoming request to the string "card type" and the type value in the incoming request to "gold." If a match occurs, the incoming user request is converted to a new request that is transmitted to a destination server that handles high speed wireless credit card payments 820; otherwise, by default, the incoming user request is converted to a new request that is transmitted to a destination server that handles normal speed wireless credit card payments 822.

FIG. 9 is an example of an intelligent proxy rule written as pseudo-code. In FIG. 9, a condition is met if the user-agent variable in the HTTP header of the incoming request matches the substring "Palm." This type of condition that compares a string with a user-agent header variable is referred to as user agent matching. In the example, a nested condition is met if a left substring match of the URI specified in the incoming request and the predetermined value of the string "/banking" is successful. This type of condition that compares a string with the URI in an incoming request is referred to as URI substring matching. The request is forwarded to the URL banking.palm.companyname.com/banking$1 when these two conditions (i.e., the user-agent header variable matches "Palm" and the URI includes "/banking"), are met. If the two conditions are not met, by default, the request is forwarded to the URL palm.companyname.com.

Another case illustrated in FIG. 9 matches the user-agent to "Nokia_WAP" and forwards the request to the URL wap.companyname.com/$1 if the match is successful. The completion marker "$1" appends the entire request URI to the partial URL (i.e., wap.companyname.com). The intelligent proxy rules can use other completion markers. For example, a completion marker having the syntax "$2" may cause the part of the URI that remains after a left substring match of a URI substring matching condition to be appended to a URL being constructed for the purpose of forwarding the request.

The intelligent proxy rules recognize other conditions than those just described and illustrated. A content type matching condition is met if the file extension in the URI matches the file extension included in the condition. A server name condition is met if the value of the HTTP host header in the incoming request matches a predetermined value included in the condition. Active conditions are supported through a JAVA based API allowing custom or dynamic conditions to be created using data in the incoming request. Active conditions can be intermixed with standard pre-defined conditions.

Implementations can change the order in which steps are performed, combine various steps, or add steps in one or more of the procedures discussed herein. Additionally, the servlets illustrated in FIG. 5 may be combined or the functions in the servlets may be implemented in servlets other than those described. Furthermore, the proxy server has the ability to run as a software cluster.

Numerous modifications and alternative embodiments of the invention will be apparent to those skilled in the art in view of the foregoing description. For example, a session scheme does not need to be device dependent, can be mapped to more than one device, and can include logic that handles more than one type of session key. Furthermore, mapping distinguishing data to a session scheme may take place on an application server or a web server. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and applicable rules of law.

What is claimed is:

1. In a proxy server in communication with a network, a method of supporting a plurality of user sessions for a plurality of electronic devices, comprising:

intercepting, at the proxy server, a first user request from a first electronic device directed to a first back-end server, the first user request including first data comprising a device identifier indicative of a vendor and model associated with the first electronic device;

mapping, at the proxy server, the first data comprising the device identifier of the first electronic device to a first session scheme based on the vendor and model associated with the first electronic device from which the first user request is received, the first session scheme determining one or more session tracking characteristics for a first user session;

determining whether a first session key exists that conforms with one or more session tracking characteristics determined by the first session scheme;

upon determining the first session key does not exist:
    searching for valid credentials associated with the first electronic device that were previously received by the proxy server; and
    upon finding valid credentials, establishing the first session key of a first type as determined by the first session scheme, the first session key holding a client state for the first user session that is stored by the electronic device;

intercepting, at the proxy server, a second user request from a second electronic device directed to a second back-end server, the second user request including second data comprising a device identifier indicative of a vendor and model associated with the second electronic device;

mapping, at the proxy server, the second data comprising the device identifier of the second electronic device to a second session scheme based on the vendor and model associated with the second electronic device from which the second user request is received, the second session scheme determining one or more session tracking characteristics for a second user session;

establishing the second user session having one or more session tracking characteristics determined by the second session scheme; and establishing a second session key of a second type as determined by the second session scheme, the second session key holding a client state for the second user session that is stored by the electronic device;

wherein the first data and the second data distinguish the first electronic device from the second electronic device;

wherein the first type of session key determined by the first session scheme is different from the second type of session key determined by the second session scheme; and wherein the first user session co-exists at least in part with the second user session.

2. The method of claim 1, wherein the first electronic device comprises a desktop computer and the second electronic device comprises a mobile telephone.

3. The method of claim 1, wherein receiving the first user request further comprises authenticating the request.

4. The method of claim 1, wherein receiving the first user request further comprises determining authorizations for the request.

5. The method of claim 1, further comprising forwarding at least one of the first user request and the second user request to a third electronic device.

6. The method of claim 5, further comprising receiving a response from the third electronic device.

7. The method of claim 1, wherein mapping the first data to the first session scheme comprises examining an HTTP header to identify a type of the first electronic device.

8. The method of claim 1, further comprising utilizing an application program interface to generate at least one API session scheme capable of retrieval of the first session key to locate the first user session stored in one of a cookie, a persistent session store, and a storage device.

9. The method of claim 8, wherein the API session scheme includes at least one of a context validation function, a retrieval function, a create key function, a create session function, an update function, and a logout function.

10. The method of claim 1, further comprising:
receiving a subsequent user request from the first electronic device, the subsequent user request including the first data;
mapping the first data included in the subsequent user request to the first session scheme; and
retrieving the first session key as determined by the first session scheme.

11. The method of claim 1, wherein the first type of session key and the second type of session key are selected from a group consisting of cookies, secure sockets layer identifiers, IP addresses, device identifiers, and re-written URLs.

12. The method of claim 10, further comprising utilizing the first session key to locate the first user session.

13. The method of claim 12, wherein utilizing the first session key comprises locating the first user session in one of a cookie, a persistent session store, and a storage device, and providing access to the user session.

14. The method of claim 10, further comprising:
forwarding the first user request to a third electronic device;
receiving a response from the third electronic device; and
forwarding the response to the first electronic device.

15. The method of claim 1, wherein the first type of session key is a cookie and the second type of session key is selected from a group consisting of a secure sockets layer identifier, an IP address, a device identifier, and a re-written URL.

16. The method of claim 1, wherein the first type of session key is a re-written URL and the second type of session key is selected from a group consisting of a secure sockets layer identifier, a device identifier, and an IP address.

17. The method of claim 1, wherein the first type of session key is a secure sockets layer identifier and the second type of session key is selected from a group consisting of a device identifier and an IP address.

18. The method of claim 1, further comprising:
intercepting, at the proxy server, a third user request from a third electronic device, the third user request including third data comprising an attribute of the third electronic device;
mapping, at the proxy server, the third data comprising an attribute of the third electronic device to a third session scheme, the third session scheme determining one or more session tracking characteristics for a third user session;
establishing the third user session having one or more session tracking characteristics determined by the third session scheme; and
establishing a third session key of a third type as determined by the third session scheme, the third session key holding a client state for the third user session;
wherein the first data, the second data and the third data distinguish the first electronic device, the second electronic device, and the third electronic device from one another;
wherein the first type of session key determined by the first session scheme, the second type of session key determined by the second session scheme, and the third type of session key determined by the third session scheme are each of different types from one another; and
wherein the first user session, second user session, and third user session co-exists at least in part with one another.

19. The method of claim 1, wherein the device identifier indicative of a type of device of the first electronic device comprises a device identifier indicative of the type of device of the first electronic device identifying a device type selected from the group consisting of a pocket PC type of device, a smart phone type of device, a television set interface type of device, a personal data assistant type of device, and a personal computer type of device.

20. The method of claim 1, further comprising mapping the first and second user requests to first and second uniform resource locator addresses associated with the first and second backend servers, respectively.

21. The method of claim 1, wherein the proxy server is managed by the vendor of the first electronic device.

22. The method of claim 1, further comprising adding a proxy server identifier to the first and second user requests, the proxy server identifier specifically designating the proxy server that intercepted the first and second user requests.

23. The method of claim 1, wherein the second back-end server is different than the first back-end server.

24. In a proxy server in communication with a network, a method of supporting a plurality of user sessions for a plurality of electronic devices, comprising:
intercepting, at the proxy server, a first user request from a first electronic device directed to a first back-end server;
extracting first data from the first user request, the first data comprising a device identifier indicative of a vendor and model associated with the first electronic device;
locating, at the proxy server, a first session scheme that correlates to the first data comprising the device identifier of the first electronic device, the first session scheme determining one or more tracking characteristics for a first user session;

retrieving the first session scheme based on the vendor and model associated with the first electronic device from which the first user request is received;

determining whether there exists a first session key of a first type that conforms with the first session scheme, the first session key holding a client state for the first electronic device that is stored by the electronic device;

upon determining the first session key does not exist:
  searching for valid credentials associated with the first electronic device that were previously received by the proxy server; and
  upon finding valid credentials, establishing the first session key of a first type as determined by the first session scheme, the first session key holding a client state for the first user session that is stored by the electronic device;

intercepting, at the proxy server, a second user request from a second electronic device directed to a second back-end server;

extracting second data from the second user request, the second data comprising a device identifier indicative of a vendor and model associated with the second electronic device;

attempting to locate, at the proxy server, a second session scheme that correlates to the second data comprising the device identifier of the second electronic device, the second session scheme determining one or more tracking characteristics for a second user session;

at least one of retrieving the second session scheme if the second session scheme is located, providing a default session scheme if the second session scheme is not located, and rejecting the second user request if the default session scheme is not located; and if one of the second session scheme and the default session scheme is located, obtaining a second session key of a second type as instructed by one of the second session scheme and the default session scheme, the second session key holding a client state for the second electronic device that is stored by the proxy server;

wherein the first data and the second data distinguish the first electronic device from the second electronic device; and wherein the first type of session key is different from the second type of session key.

25. The method of claim 24, further comprising one of forwarding the first user request upon locating the first user session utilizing the first session key and forwarding the first user request after creating the first user session in association with the first session key.

26. The method of claim 25, further comprising determining a uniform resource locator to which the first user request is forwarded, the uniform resource locator indicating an electronic server device configured in the network.

27. The method of claim 25, further comprising forwarding data from the first user session to an electronic server device configured in the network.

28. The method of claim 25, wherein the first user session comprises data in the form of at least one of a user identifier, a preference, authentication data, and a session expiration period.

29. The method of claim 25, wherein forwarding the first user request comprises executing a proxy rule, the proxy rule determining an electronic server device to receive the first user request.

30. The method of claim 29, wherein executing the proxy rule comprises:
  analyzing data from at least one of the first user request, the first user session, and a stored user record;
  comparing at least one property associated with the data to at least one predetermined value; and
  converting the first user request to a new request according to a result of comparing at least one property associated with the data to at least one predetermined value.

31. The method of claim 30, wherein the at least one predetermined value specifies one of a URL, an authentication indicator, a device type, a host, a user class, and a level of service.

32. The method of claim 24, wherein obtaining the first session key comprises one of locating and creating the first user session in one of a cookie, a persistent session store, and a storage device, and providing access to the first user session.

33. The method of claim 24, wherein the first type of session key and the second type of session key are selected from a group consisting of cookies, secure sockets layer identifiers, IP addresses, device identifiers, and re-written URLs.

34. The method of claim 24, wherein the first data contains a device identifier identifying a type of the first electronic device transmitting the user request.

35. The method of claim 24, wherein the first type of session key is an IP address and the second type of session key is a device identifier.

36. A non-transitory computer readable medium containing a software tool for executing a method of supporting a plurality of user sessions for a plurality of electronic devices, the method comprising:
  intercepting, at the proxy server, a first user request from a first electronic device directed to a first back-end server, the first user request including first data comprising a device identifier indicative of a vendor and model associated with the first electronic device;
  mapping, at the proxy server, the first data comprising the device identifier of the first electronic device to a first session scheme based on the vendor and model associated with the first electronic device from which the first user request is received, the first session scheme determining one or more session tracking characteristics for a first user session;
  determining whether a first session key exists that conforms with one or more session tracking characteristics determined by the first session scheme;
  upon determining the first session key does not exist:
    searching for valid credentials associated with the first electronic device that were previously received by the proxy server; and
    upon finding valid credentials, establishing the first session key of a first type as determined by the first session scheme, the first session key holding a client state for the first user session that is stored by the electronic device;
  intercepting, at the proxy server, a second user request from a second electronic device directed to a second back-end server, the second user request including second data comprising a device identifier indicative of a vendor and model associated with the second electronic device;
  mapping, at the proxy server, the second data comprising the device identifier of the second electronic device to a second session scheme based on the vendor and model associated with the second electronic device from which the second user request is received, the second session scheme determining one or more session tracking characteristics for a second user session;
  establishing the second user session having one or more session tracking characteristics determined by the second session scheme; and
  establishing a second session key of a second type as determined by the second session scheme, the second session key holding a client state for the second user session that is stored by the electronic device;

wherein the first data and the second data distinguish the first electronic device from the second electronic device;

wherein the first type of session key determined by the first session scheme is different from the second type of session key determined by the second session scheme; and wherein the first user session co-exists at least in part with the second user session.

37. A non-transitory computer readable medium containing a software tool for executing a method of supporting a plurality of user sessions for a plurality of electronic devices, comprising:

intercepting, at the proxy server, a first user request from a first electronic device directed to a first back-end server;

extracting first data from the first user request, the first data comprising a device identifier indicative of a vendor and model associated with the first electronic device;

attempting to locate, at the proxy server, a first session scheme that correlates to the first data comprising the device identifier of the first electronic device, the first session scheme determining one or more tracking characteristics for a first user session;

retrieving the first session scheme based on the vendor and model associated with the first electronic device from which the first user request is received;

determining whether there exists a first session key of a first type that conforms with the first session scheme, the first session key holding a client state for the first electronic device that is stored by the electronic device;

upon determining the first session key does not exist:
    searching for valid credentials associated with the first electronic device that were previously received by the proxy server; and
    upon finding valid credentials, establishing the first session key of a first type as determined by the first session scheme, the first session key holding a client state for the first user session that is stored by the electronic device;

intercepting, at the proxy server, a second user request from a second electronic device directed to a second back-end server;

extracting second data from the second user request, the second data comprising a device identifier indicative of a vendor and model associated with the second electronic device;

attempting to locate, at the proxy server, a second session scheme that correlates to the second data comprising the device identifier of the second electronic device, the second session scheme determining one or more tracking characteristics for a second user session;

at least one of retrieving the second session scheme if the second session scheme is located, providing a default session scheme if the second session scheme is not located, and rejecting the second user request if the default session scheme is not located; and if one of the second session scheme and the default session scheme is located, obtaining a second session key of a second type as instructed by one of the second session scheme and the default session scheme, the second session key holding a client state for the second electronic device that is stored by the proxy server;

wherein the first data and the second data distinguish the first electronic device from the second electronic device; and wherein the first type of session key is different from the second type of session key.

38. The method of claim 37, further comprising one of forwarding the first user request upon locating the first user session utilizing the first session key and forwarding the first user request after creating the first user session in association with the first session key.

39. The method of claim 38, wherein forwarding the first user request comprises executing a proxy rule, the proxy rule determining an electronic server device to receive the first user request.

* * * * *